United States Patent
Laine et al.

(10) Patent No.: US 9,355,276 B2
(45) Date of Patent: May 31, 2016

(54) PROCESSING SYSTEM

(71) Applicant: NXP B.V., Eindhoven (NL)

(72) Inventors: Nicolas Laine, Caen (FR); Andre Lepine, Le Mesnil Rouxelin (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/258,933

(22) Filed: Apr. 22, 2014

(65) Prior Publication Data
US 2014/0359788 A1  Dec. 4, 2014

(30) Foreign Application Priority Data
May 29, 2013  (EP) ..................................... 13290119

(51) Int. Cl.
*G06F 21/00* (2013.01)
*G06F 21/62* (2013.01)
*G06F 21/14* (2013.01)
*G06F 21/79* (2013.01)
*G06F 21/57* (2013.01)

(52) U.S. Cl.
CPC .............. *G06F 21/629* (2013.01); *G06F 21/14* (2013.01); *G06F 21/572* (2013.01); *G06F 21/79* (2013.01)

(58) Field of Classification Search
None
See application file for complete search history.

(56) References Cited

U.S. PATENT DOCUMENTS

| | | | | |
|---|---|---|---|---|
| 5,867,655 A | * | 2/1999 | DeRoo et al. ................. | 709/213 |
| 7,069,452 B1 | * | 6/2006 | Hind ..................... | G06F 21/572 713/1 |
| 7,254,716 B1 | * | 8/2007 | Giles ................... | G06F 21/6218 380/210 |
| 7,874,009 B2 | * | 1/2011 | Kanemura ...................... | 726/27 |
| 8,171,309 B1 | * | 5/2012 | Poo ..................... | G06F 11/3548 713/182 |
| 8,214,653 B1 | * | 7/2012 | Marr ..................... | G06F 21/572 380/286 |
| 8,423,794 B2 | * | 4/2013 | Holtzman ............... | G06F 21/10 380/259 |
| 8,522,339 B2 | * | 8/2013 | Ohto ........................ | G06F 8/65 726/19 |
| 8,549,644 B2 | * | 10/2013 | Sallam .................. | G06F 21/566 726/23 |
| 2003/0125706 A1 | * | 7/2003 | Popp et al. ..................... | 604/391 |
| 2003/0135706 A1 | * | 7/2003 | Lin ..................... | G06F 21/6209 711/163 |
| 2004/0039924 A1 | * | 2/2004 | Baldwin et al. ............... | 713/189 |
| 2004/0117575 A1 | | 6/2004 | Link et al. | |
| 2007/0033454 A1 | * | 2/2007 | Moss ..................... | G06F 21/74 714/724 |
| 2007/0113064 A1 | | 5/2007 | Wei et al. | |
| 2007/0156638 A1 | * | 7/2007 | Vadekar et al. .................... | 707/1 |
| 2008/0016395 A1 | * | 1/2008 | Feng ................ | G01R 31/31719 714/27 |

(Continued)

OTHER PUBLICATIONS

Berthier, Robin; Sanders, William H. Specification-based Intrusion Detection for Advanced Metering Infrastructures. 2011 IEEE 17th Pacific Rim International Symposium on Dependable Computing (PRDC). Relevant pp. 184-193. http://ieeexplore.ieee.org/stamp/stamp.jsp?tp=&arnumber=6133080.*

(Continued)

*Primary Examiner* — Jeremiah Avery

(57) ABSTRACT

A processing system is disclosed. The system comprises: a processing unit; a memory adapted to store firmware code and application code for execution by the processor; and a memory access control unit adapted to control access of the processing unit to firmware code and application code stored in the memory. The memory access control unit is adapted to disable access to firmware code when access to application code is enabled, and to disable access to application code when access to firmware code is enabled.

14 Claims, 7 Drawing Sheets

(56) References Cited

U.S. PATENT DOCUMENTS

| | | |
|---|---|---|
| 2008/0082833 A1 | 4/2008 | Lewis et al. |
| 2008/0163359 A1 | 7/2008 | Conti |
| 2012/0079563 A1* | 3/2012 | Green .................. G06F 21/572 726/3 |
| 2012/0079590 A1* | 3/2012 | Sastry ................ G06F 12/1458 726/21 |
| 2012/0260082 A1* | 10/2012 | Bobzin ................ G06F 9/4411 713/100 |
| 2014/0006692 A1* | 1/2014 | Berntsen ............ G06F 12/0246 711/103 |

OTHER PUBLICATIONS

Pishva, Davar; Takeda, Keiji. Product-Based Security Model for Smart Home Applicances. IEEE Aerospace and Electronic Systems Magazine. vol. 23, Issue: 10. Relevant pp. 32-41. Pub. Date: 2008. http://ieeexplore.ieee.org/stamp/stamp.jsp?tp=&arnumber=4665323.*

Extended European Search Report for EP Patent Appln. No. 13290119.0 (Jul. 19, 2013).

* cited by examiner

PROCESSING SYSTEM

CROSS-REFERENCE TO RELATED APPLICATIONS

This application claims the priority under 35 U.S.C. §119 of European patent application no. 13290119.0, filed on May 29, 2013, the contents of which are incorporated by reference herein.

FIELD OF THE INVENTION

This invention relates to processing systems, and more particularly to controlling access of a processing unit of a processing system to firmware stored by the processing system.

BACKGROUND

Security is an important consideration for processing systems such as microcontrollers. For example, it may be desirable to ensure that a processor only executes a specific task which is described by a piece of executable program code (or equivalent set of instructions, such as a script for example). However, the code and/or execution of the code may be may be subject to attacks. Attacks may include any of the following exemplary list:
  unauthorized modification of stored program code;
  modification of code during execution;
  code dumping (e.g. reading out code for the purposes of reverse engineering);
  unauthorized changing of memory access privileges;
  execution of unauthorized code from data segments Firmware, for example basic input/output system (BIOS) code or core system software code, is typically operative to recognize and initialize hardware subsystems and components of a processing system or electronic device. Consequently, reverse engineering of firmware by a third-party may provide indications of hardware architecture of a system employing the firmware integrated circuit. Also, successful attacks (such as those listed above) on firmware may enable a third-party to alter the operation of a processing system, prevent the processing system from operating correctly, and/or transmit viruses to components or other systems/devices.

It is known to protect firmware using hardware-based security, such as storing firmware in non-volatile memory (such as Read-Only-Memory, ROM, for example) so that it cannot be modified within the memory. However, this may not provide adequate protection from a third-party accessing the firmware and analysing it for undesired or unauthorized purposes.

Such considerations are important in the field of third-party development where a third-party developer is left to develop and debug an application directly on a processing system. For such development, the processing system may require the execution of embedded firmware provided by the manufacturer and used during the application, but it may be desirable to hide/protect the firmware from the third-party developer during application execution for security reasons.

BRIEF SUMMARY OF THE INVENTION

There is proposed a concept for controlling access to firmware code of a processing system. The concept may be employed to provide embedded and secured firmware execution within a system-on-chip application development system. Such a development system may thus enable a third-party developer to make use of existing firmware of the system for the purpose of application development whilst also preventing the developer from accessing the firmware code for an unauthorized purpose (such as analysis and/or reverse engineering for example). Embodiments may therefore restrict or prevent software reverse engineering by controlling access to firmware code.

According to an embodiment of the invention, there is provided a processing system according to independent claim 1.

The processing system may be a microcontroller, a microprocessor, a microchip or a processing platform. Therefore the processor may be a central processing unit (CPU) or a processor core.

The system may further comprise a debug interface for enabling debugging of application code stored by the memory. The memory access control unit may be adapted to disable the debug interface so that debugging cannot be performed when access to firmware code is enabled.

The memory access control unit may be connected between the processor and the memory, and may be adapted to intercept a memory access request from the processor and to control access to the memory based on the intercepted memory access request.

The memory access control unit may comprise a register adapted to store an address representing the location of firmware code in memory, and the memory access control unit may be adapted to determine if the intercepted memory access request is requesting access to the address stored in the register and to control access to the memory based on an outcome of the determination The memory access control unit may be implemented in non-volatile memory (such as Read-Only-Memory, ROM, for example) so that it is protected from being modified.

According to an embodiment of the invention, there is provided a method of controlling access of a processing unit of a processing system to firmware code and application code stored by a memory of the processing system according to claim 10.

BRIEF DESCRIPTION OF THE DRAWINGS

Preferred embodiments of the present invention will now be described, by way of example only, with reference to the following drawings in which.

DETAILED DESCRIPTION OF THE EMBODIMENTS

Figure 1:
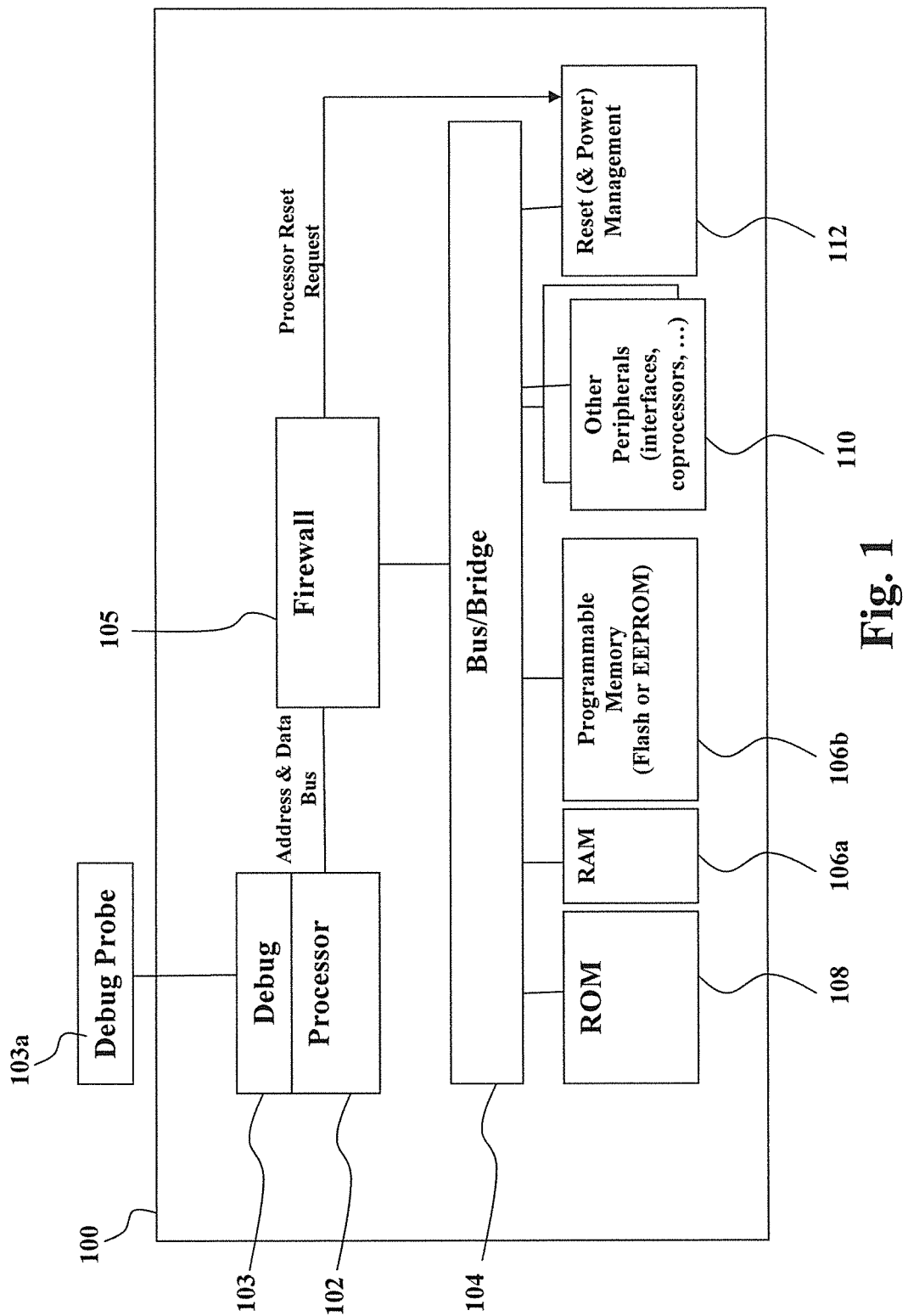
FIG. 1 is a schematic block diagram of a processing system according to an embodiment of the invention.

Besides the components typically present in a processing system (a processor unit or CPU, memory, and peripherals, all connected by a communication bus/bridge), proposed embodiments further comprise an additional component: a memory access control unit (hereinafter referred to as a 'firewall'). The firewall protects the processing system from unwanted or unauthorized attacks by controlling access to firmware code.

Here, reference to firmware code should be understood to mean a combination of persistent memory and program code and data stored in it, such as the BIOS code or core system software code for a processing system, which is typically provided in non-volatile memory by the manufacturer or supplier of the processing system. Firmware code is different from application code in that application code is typically designed to implement higher-level or supplementary functions in addition to the function(s) provided by firmware code, and application code is typically a set of machine-readable instructions (most often in the form of a computer program) stored on volatile memory that directs a processor to perform specific operations. Thus, firmware code is typically permanently stored in hardware (specifically in non-volatile memory), whereas application code is typically stored in volatile or programmable memory so that can be modified.

Put another way, firmware code is inherited by a hardware implementation, independent from its application. Two different types of services are supported by firmware code: Low-Level services, including generic interface control handling and the hardware abstraction layer (register control, power management, etc.); and Secure private functions, including a boot sequence, services protected (e.g. access-restriction) from an end user, and system supervision. This code is typically protected from an end user (to prevent unauthorised modification for example).

Conversely, application code is dedicated to a final use of the processing system, independent from the hardware implementation solution. Any application code can be developed by reusing the low-layer level functions (part of firmware code). This code is opened to the end user to improve flexibility.

The firewall prevents access to firmware code when application code access is enabled, and the firewall prevents access to application code when firmware code access is enabled. In this way, firmware code can be executed (for the purpose of third-party application development, for example) whilst access to application code (which may be unsecured and/or editable, for example) is prevented. Conversely, application code can be accessed (for the purpose of third-party application development, for example) whilst access to firmware code is prevented.

The firewall (or memory access control unit) controls access to regions of memory of a processing system. It may therefore restrict access that components of the processing system have to areas of memory, such as ROM areas for example. A decision by the firewall to enable or disable access to certain memory areas may be conditional on an operating mode of the system. For example, in a particular embodiment, the firewall may be adapted to allow or deny fetching of code from certain regions in memory based on whether this code is indicated to be part of firmware code or application code. Thus, the processor unit may be restricted to only have access to the areas of memory that are identified as being secured (e.g. a non-volatile memory area for storing firmware code) when access to one or more other areas of memory identified as being unsecured (e.g. a volatile memory area for storing third-party application code) is prevented. Put another way, the processor unit can be prevented from simultaneously accessing both secure (e.g. non-volatile) and insecure (e.g. volatile) regions of memory.

Referring to FIG. 1, there is shown a schematic block diagram of a processing system 100 according to an embodiment of the invention. The system comprises a processor unit or CPU 102 (with a debug interface 103) connected to communication bus 104 via a memory access control unit or firewall 105. Here the debug interface 103 of the CPU 102 is a debug JTAG interface 103 which connects to a debug probe 103a to enable a user to inspect and debug code. In other embodiments however, the debug interface 103 may comprise a Serial Wire Debug (SWD). SWD provides a debug port for severely pin-limited packages, which is often the case for small package microcontrollers (but also complex ASICs where limiting pin-count is critical) and can be the controlling factor in device costs.

Also connected to the communication bus 104 are volatile 106 and non-volatile 108 memory units, peripherals 110, and a reset/power management unit 112.

Here, the non-volatile memory unit 108 comprises a ROM unit 108 storing: a firmware boot code sequence for booting/initializing the system 100; secured firmware code to be protected during third-party application execution; services implementation derived manufacturer internal firmware; and dispatcher function code for switching between user application execution to firmware execution modes.

The volatile memory 106 comprises a Random Access Memory (RAM) unit 106a and programmable memory 106b such as flash memory or EEPROM. The RAM unit 106a is for storing data used by the CPU 102 during either boot code execution or application code execution. The programmable memory 106b is adapted to store application code from a third-party developer (e.g. program code used for the final application of the system); additional secured firmware code; and/or patch code for the secured firmware code to protect in the ROM unit 108. The programmable memory 106b may also store dispatcher function code (if not located/used from the ROM unit 108).

It is therefore to be understood that, unlike conventional processing systems, the system 100 of FIG. 1 further comprises a memory access control unit or firewall 105. The firewall is (at least) assumed to be able to receive a code access request from the processor and to control access of the processor 102 to areas of system memory. It can therefore, for example, be connected between the processor 102 and the communication bus 104.

The firewall 105 is adapted to manage different system modes in order to implement firmware protection. By default, the system boots in a "system mode" during which the debug interface 103 is locked and cannot be used.

Once the boot procedure has completed, the firmware will instruct the firewall 105 to enter a "Normal Mode". When in the Normal Mode, application code of a third-party developer which is located in the programmable memory 106b can be executed and access to firmware code in the ROM unit 108 is prevented. When the application code calls a function defined in the secured firmware code located in the ROM unit 108 the firewall 105 causes the system to enter a "Secured Mode". When in the Secured Mode, firmware code located in the ROM unit 108 can be executed and access to application code located in the programmable memory 106b is prevented.

The firewall 105 is thus adapted to control access to memory 106,108 of the system 100 depending on which mode of operation the system is in. Put another way, the firewall 105 determines whether to grant or deny access to certain memory areas based on whether third-party application code or firmware code is being executed. For example, here, the firewall 105 prevents simultaneous access to firmware code and third-party application code.

Figure 2:
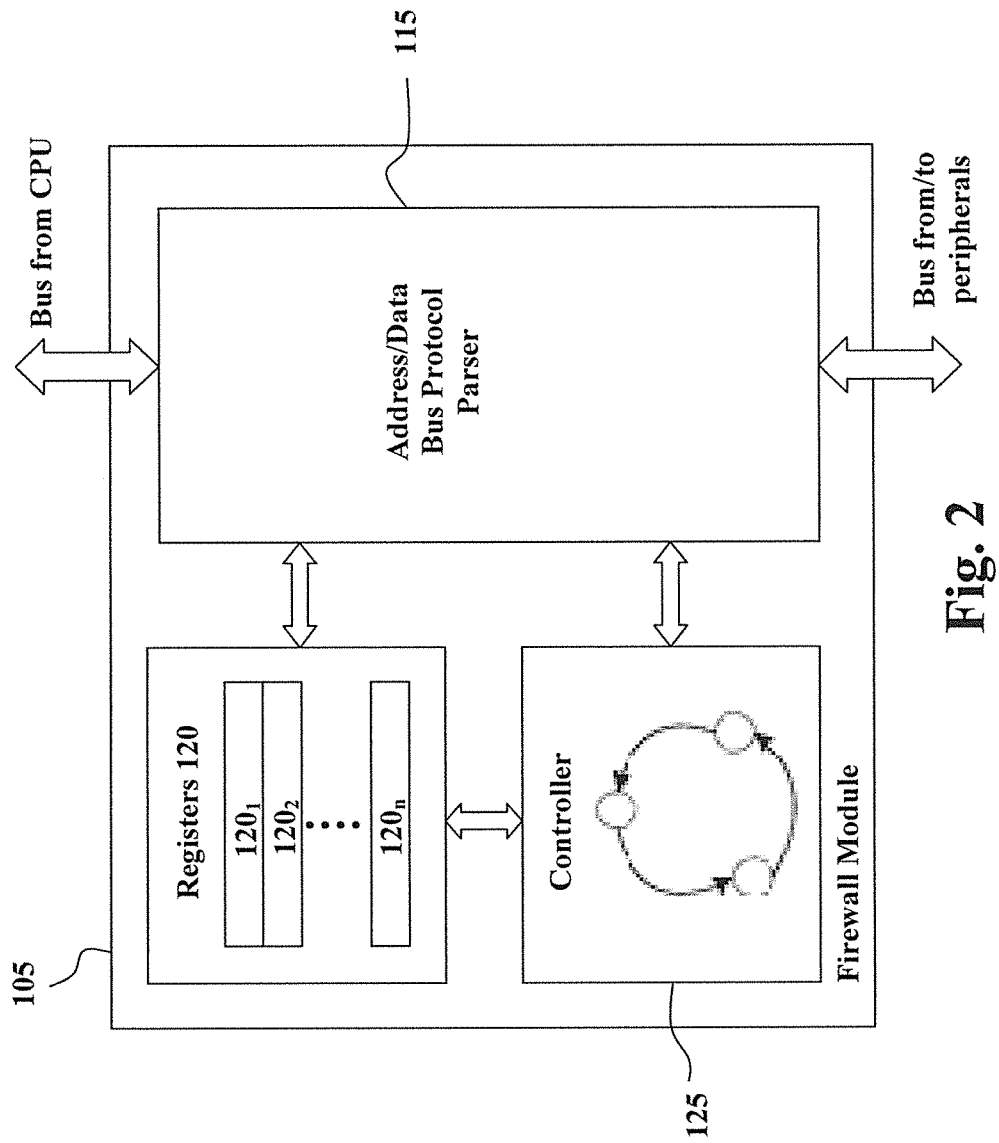
FIG. 2 is a schematic block diagram of the memory access control unit of the embodiment of FIG. 1.

Turning now to FIG. 2, exemplary operation of the firewall 105 of FIG. 1 will be described in more detail.

The firewall 105 comprises an address/data bus parser 115, a plurality of registers $120_1$ to $120n$ each adapted to store an entry-point address, and a state controller 125. The address/data bus parser 115 intercepts instructions from the CPU 102 and employs an address comparator which compares an address request of an instruction with the entry-point addresses contained in a registers 120.

During the execution of application code located in the programmable memory 106b, the firewall 105 allows the application code to call firmware code located in the ROM unit 108 through a single entry point. The entry point for calling firmware code is defined in a register 120 of the firewall 105. It is noted here that during execution of application code (i.e. during "Normal Mode"), the firewall registers 120 are not accessible by the processor 102.

For each new bus access from the processor 102, the firewall 105 checks the entry-point address in a register 120 to determine if it is equal to the address required by the processor 102. If the required address matched the entry-point address, it is determined that the application code is calling firmware code and so the firewall 105 disables any further access to the programmable memory 106 and disables the debug interface 103. In other words, if it is determined that the application code is calling firmware code, the firewall causes the system to enter the "Secured Mode" in which firmware code located in the ROM unit 108 can be accessed or executed and access to the programmable memory 106b is disabled along with the debug interface 103.

From this point (i.e. when in the "Secured Mode"), firmware code in the ROM unit 108 can be executed with a high level of security, since access to the programmable memory 106 is disables and the debug interface is locked. It is also noted that during this time, access to the firewall registers 120 by the secured firmware code is allowed. In addition, if the system 100 contains some secured firmware code in the programmable memory 106, the firewall 105 will enable its execution. This can be used, for example, to execute patches of the firmware code.

At the end of the execution of the secured firmware code (e.g. when the firewall 105 detects a return procedure), the firewall 105 causes the system to re-enter the "Normal Mode" (in which access to the firmware code is disabled and access to the application code in the programmable memory 106b is enabled along with the debug interface 103). It is noted that the programmable memory 106b access is re-enabled only if the secured firmware code is clearing a bit in the firewall register 120 in order to allow the switch back to the Normal Mode. For the case that a return procedure is detected by the firewall 105 without clearing this bit in the firewall register 120, the firewall 105 will automatically reset the processor 102 & RAM 106a for security purposes. Further, if application code tries to call an address of firmware code within the ROM 108 which is not the static entry point address, the firewall resets the processor 102 and the RAM 106a in order to prevent illegal access to the secured firmware.

The firewall 105 (or memory access control unit) may be implemented in a centralized or distributed manner, depending on the embodiment. In a centralized implementation, one device implements the firewall 105 functionality and manages all memories. In a distributed implementation, each memory type may have its own device implementing a part of the firewall 105 functionality only for that particular memory.

The firewall 105 may be implemented, depending on the embodiment, as part of an existing component of a processor (platform) such as a Memory Management Unit, a Memory Protection Unit, an Address Decoder, a Memory Interface (in case of a distributed implementation), or it may be implemented as a separate device.

The firewall 105 may also prevent the processing unit (CPU) 102 from executing a command in several different ways. For example it may generate a memory error, trigger an interrupt, provide a non-executable instruction, return a NOP instruction, or a combination thereof.

Figure 3:
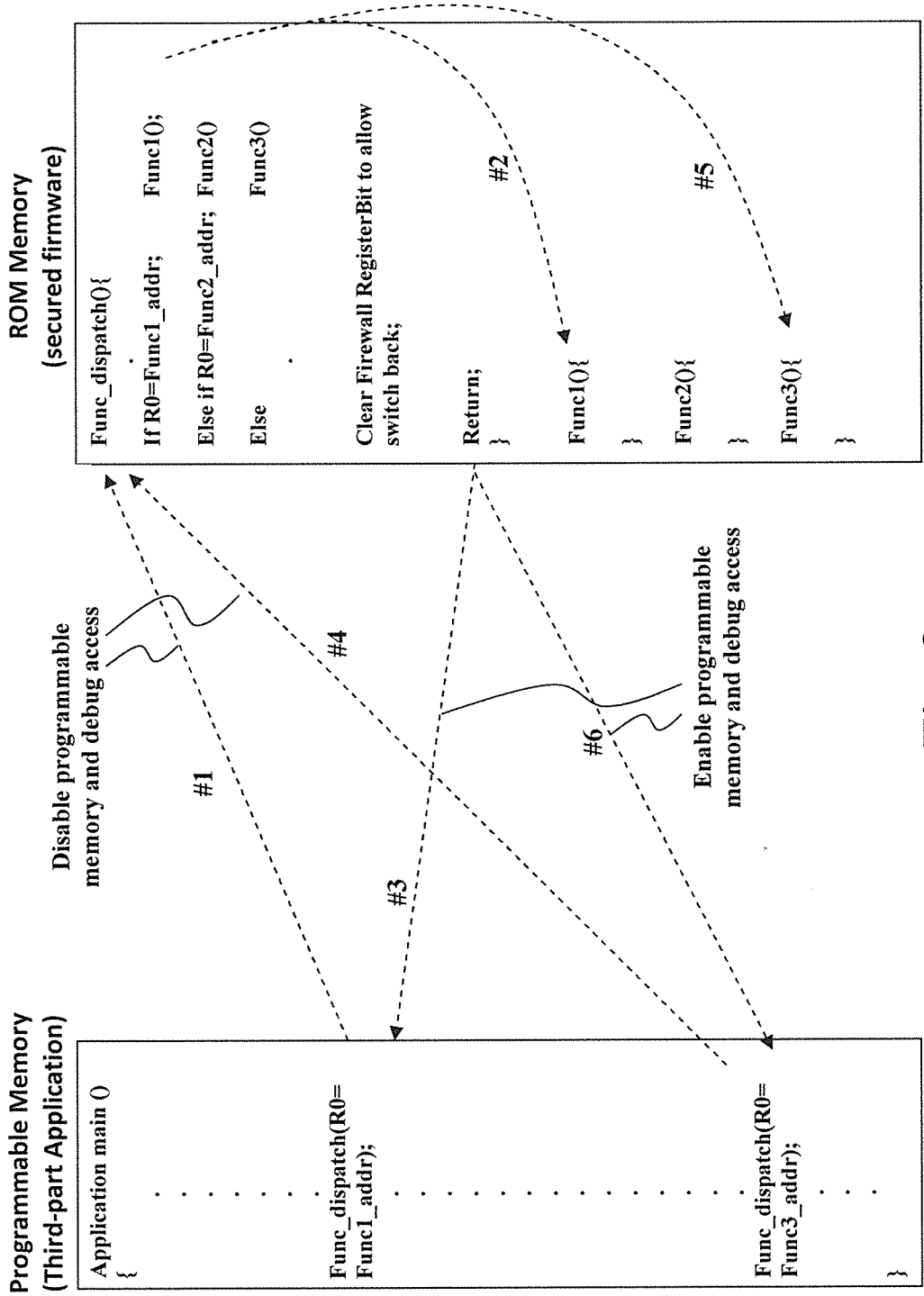
FIG. 3 depicts an example of mode switching between application code and firmware code according to an embodiment of the invention.

Referring now to FIG. 3, an example of mode switching between application code and firmware code will now be described.

As has already been described above with reference to FIG. 2, the firewall 105 provides a single entry point to the secured firmware code. This entry point is located at a predetermined fixed address that corresponds to the address of a dispatcher function. One or more parameters are provided to the dispatcher function to define which function(s) of the secured firmware to execute.

When the dispatcher function is called (i.e. when the predetermined fixed address is requested), the firewall 105 switches the system from Normal Mode to Secured Mode by enabling access to the secured firmware and disabling application code and debug access (Step #1).

The dispatcher function in the ROM is then executed and, based on the parameter(s) provided to the dispatcher function, a function of the secured firmware is executed (Step #2). Here, the parameter provided is R0=Func1_addr which requests a first function Fund( ) of the secured firmware.

After executing the function of the secured firmware, the dispatcher function is left and the application code is returned to (by processing as a normal return function). When returning to the application code, the firewall switches the system from Secured Mode to Normal Mode, by disabling access to the secured firmware and enabling application code and debug access (Step #3).

Execution of the application code is then continued until the dispatcher function is called once again. Upon calling of the dispatcher function once again, the firewall 105 switches the system from Normal Mode to Secured Mode by enabling access to the secured firmware and disabling application code and debug access (Step #4).

The dispatcher function in the ROM is then executed and, based on the parameters provided to the dispatcher function, a function of the secured firmware is executed (Step #5). Here, the parameter provided with this second call for the dispatcher function is R0=Func3_addr which requests a third function Func3( ) of the secured firmware.

After executing the function of the secured firmware, the dispatcher function is left and the application code is returned to (by processing as a normal return function). When returning to the application code, the firewall 105 switches the system from Secured Mode to Normal Mode by disabling access to the secured firmware and enabling application code and debug access (Step #6).

For embodiments where some secured firmware is also located in programmable memory, it is also possible to have the dispatcher function in the programmable memory.

Embodiments also offer the possibility of executing patch code for secured firmware code. Patch code may be located in a secured area of programmable memory, and patch code may be used when secured firmware code has to be corrected for its execution.

Figure 4:
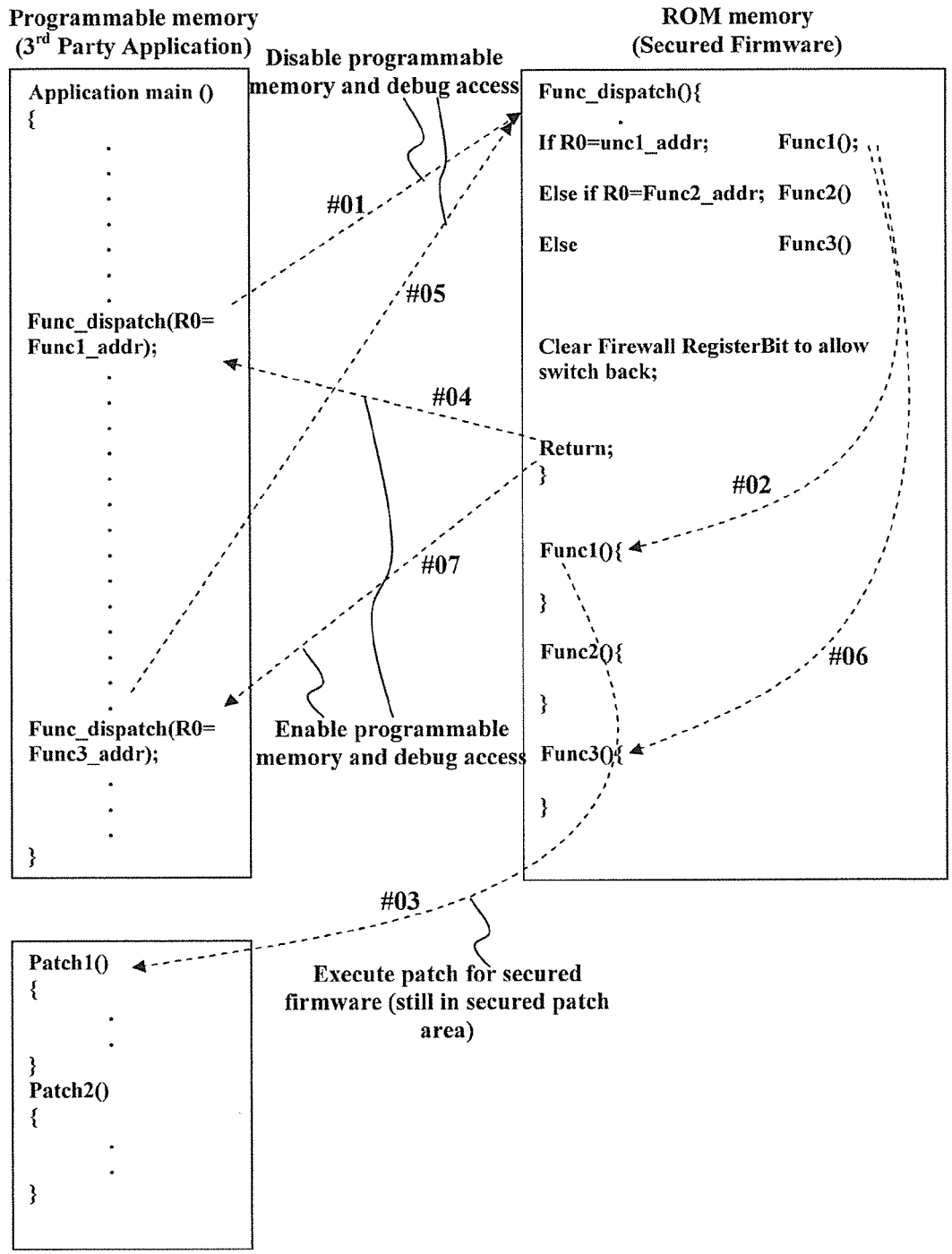
FIG. 4 depicts another example of mode switching between application code and firmware according to an embodiment of the invention, wherein a patch code for the firmware code is executed.

Referring now to FIG. 4, there is depicted an example of mode switching between application code and firmware code which employs patch code in an area of programmable memory.

When executing the application code and the dispatcher function is called (i.e. when the predetermined fixed address is requested), the firewall 105 switches the system from Normal Mode to Secured Mode by enabling access to the secured firmware and disabling application code and debug access (Step #01).

The dispatcher function in the ROM is then executed and, based on the parameter(s) provided to the dispatcher function, a function of the secured firmware is executed (Step #02). Here, the parameter provided is R0=Func1_addr which requests a first function Func1( ) of the secured firmware.

When executing the function Func1( ) of the secured firmware, patch code is requested for execution and so this patch code is called and executes (Step #03).

After executing the function Func1 ( ) of the secured firmware, the dispatcher function is left and the application code is returned to (by processing as a normal return function). When returning to the application code, the firewall 105 switches the system from Secured Mode to Normal Mode by disabling access to the secured firmware and enabling application code and debug access (Step #04).

Execution of the application code is then continued until the dispatcher function is called once again. Upon calling of the dispatcher function once again, the firewall 105 switches the system from Normal Mode to Secured Mode by enabling access to the secured firmware and disabling application code and debug access (Step #05).

The dispatcher function in the ROM is then executed and, based on the parameters provided to the dispatcher function, a function of the secured firmware is executed (Step #05). Here, the parameter provided with this second call for the dispatcher function is R0=Func3_addr which requests a third function Func3( ) of the secured firmware.

After executing the function of the secured firmware, the dispatcher function is left and the application code is returned to (by processing as a normal return function). When returning to the application code, the firewall 105 switches the system from Secured Mode to Normal Mode by disabling access to the secured firmware and enabling application code and debug access (Step #07).

Example Dispatcher Code Implementation:

The dispatcher function is located in the ROM unit 108 at the address of the unique entry point. The dispatcher function accepts up to four parameters. The first parameter is an input parameter, and the three other parameters may be input or output parameters or both according to an inner service definition.

The first parameter is a service identifier, its value being be greater than zero and lower (or equal) to the number of services available in the system. Thus, the first parameter is the index of the service to be called. Any other value raises a fault system and triggers a reset.

The three others parameters are transmitted as is to the called service. According to each service and the way they implement the usage of these parameters, the parameters might be read, written, used as reference or simply not ignored. It is up to each service implementation to check the consistency of the values of parameters according to the purpose of it. An unexpected value may raise a system fault and trigger a system reset.

An example of pseudo code for a dispatcher function according to an embodiment is as follows:

```
Func_Dispatch(param1, param2, param3, param4)
{
        if (param1 == #1) call function#1(param2, param3, param4)
        else if (param1 == #2) call function#2(param2, param3, param4)
        else if (param1 == #3) call function#3(param2, param3, param4)
        ...
        else if (param1 == #N) call function#N(param2, param3, param4)
    else system_fault(system_reset);
    firewall_switch_to_normal_mode;
}
```

The last action of the dispatcher function consists on enabling the firewall to switch the system back to the Normal Mode.

Figure 5:
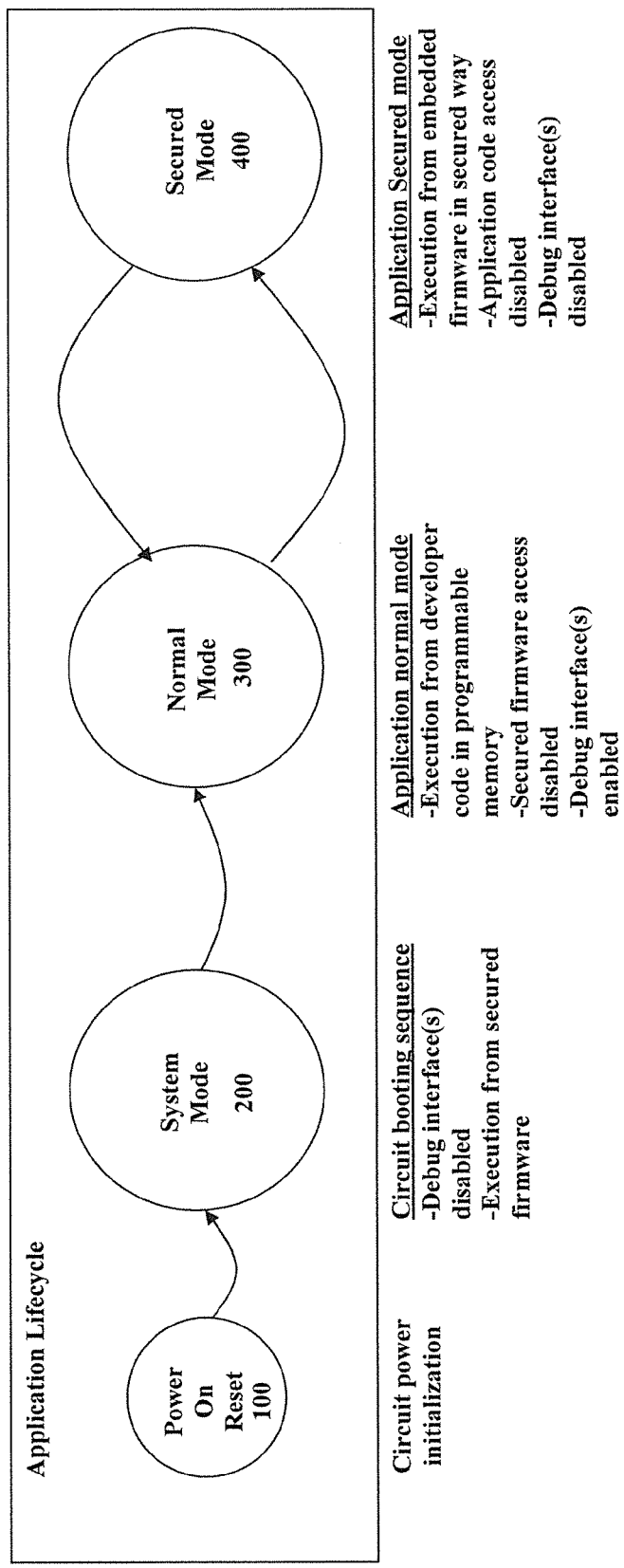
FIG. 5 is a state diagram depicting the sequence of operating modes of the embodiment of FIG. 1.

Turning now to FIG. 5, there is depicted as a state diagram showing the operating modes of the embodiment of FIG. 1. There are four operating modes: Power On Reset Mode 100; System Mode 200; Normal Mode 300; and Secured Mode 400.

The Power on Reset mode 100 implements circuit power initialization and then proceeds to System Mode 200. In System Mode 200, the circuit booting sequence is undertaken with the debug interface 103 of the CPU 102 being disabled and the secured firmware being executed to boot the system. After completion of the circuit booting sequence of the System Mode 200, the system proceeds to Normal Mode 300.

In Normal Mode 300, application code in the programmable memory is executed whilst access to the secured firmware is disabled by the firewall 105. Also, the debug interface 103 of the CPU 102 is enabled so as to permit debugging of the application code.

When firmware code is called (e.g. by requesting the address of the predetermined single entry point stored in a register of the firewall), the firewall 105 places the system in Secured Mode 400. In Secured Mode 400, the requested firmware code is executed whilst access to the application code in the programmable memory is disabled by the firewall 105. Also, the debug interface 103 of the CPU 102 is disabled in the Secured Mode 400.

Once execution of the firmware has completed in the Secured Mode 400, the system is returned to the Normal Mode 300.

Figure 6:
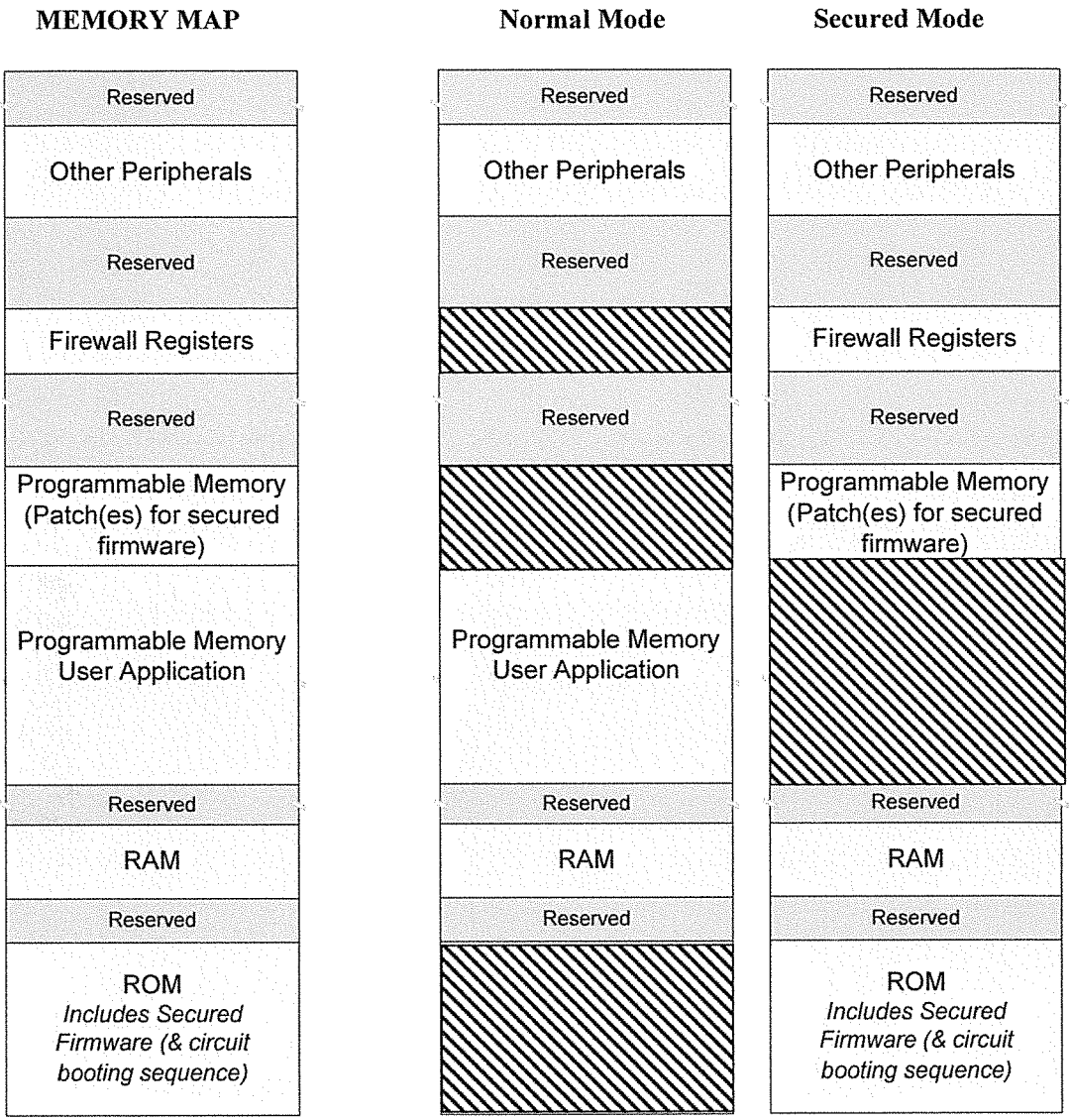
FIG. 6 illustrates a memory map of a system according to an embodiment of the invention and further depicts the accessibility of the memory in normal and secured operating modes.
Figure 7:
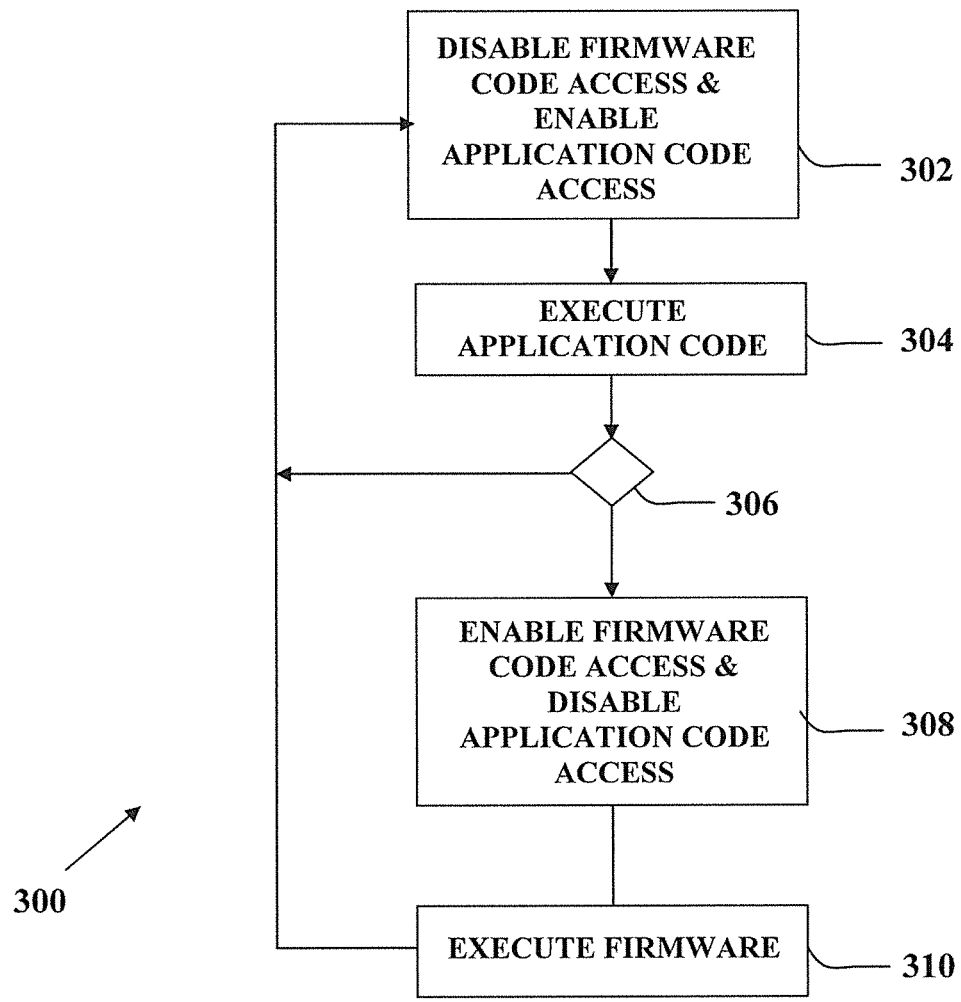
FIG. 7 is a flow diagram of a method according to an embodiment of the invention.

Referring now to FIG. 6, there is illustrated a memory map of a system according to an embodiment of the invention. This depicts the accessibility of regions of the system memory in Normal Mode and Secured Mode. It will be understood that the firewall registers, the secured area in the programmable memory and the ROM are not accessible during Normal Mode 300 (e.g. when the third party application code is executed).

Referring to FIG. 3, there is illustrated a flow diagram of a method according to an embodiment of the invention. The method provides for controlling access of a processing unit of a processing system to firmware code and application code stored by memory of the processing system.

The method begins in step 302 with the system in the Normal Mode wherein the firewall disables firmware code access and enables application code access.

Next, in step 304, the application code is executed and the method proceeds to step 306 wherein it is determined if the executed application code is calling firmware code (e.g. a firmware function). If it is determined the executed application code is not calling firmware code the method returns to step 302. If, however, it is determined in step 306 that the executed application code is calling firmware code, the method proceeds to step 308.

In step 308, the system is operated in the Secured Mode wherein the firewall enables firmware code access and disables application code access. Next, in step 310, the called firmware code is executed and, upon completion of the firmware code execution, the method returns to step 302 wherein the system is operate in the Normal Mode once again.

Embodiments may be captured in a computer program product for execution on a processor of a computer, e.g. a personal computer or a network server, where the computer program product, if executed on the computer, causes the computer to implement the steps of a method according to an embodiment. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, memory card, network-area storage device, internet-accessible data repository, and so on, may be considered.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A processing system comprising:
   a processing unit;
   memory adapted to store firmware code and application code for execution by the processor; and
   a memory access control unit adapted to control access of the processing unit to firmware code and application code stored in the memory,
   wherein the memory access control unit is adapted to transition between a normal mode in which access to firmware code is disabled when access to application code is enabled, and a secure mode in which access to application code is disabled when the application code calls to the firmware code through a single entry point address when the single entry point address matches an address stored in a register of the memory access control unit; and
   wherein the memory access control unit is adapted to transition between the normal mode and the secure mode when the application code calls a function; and
   wherein the single entry point address corresponds to a dispatcher function to which the application code passes at least one parameter to define at least one function of the firmware code to be executed.

2. The system of claim 1, further comprising a debug interface for enabling debugging of application code stored by the memory, and wherein the memory access control unit is adapted to disable the debug interface so that debugging cannot be performed when access to firmware code is enabled.

3. The system of claim 1, wherein the memory comprises non-volatile memory adapted to store firmware code and volatile memory adapted to store application code.

4. The system of claim 1, wherein the memory access control unit is connected between the processor and the memory, and wherein the memory access control unit is further adapted to intercept a memory access request from the processor and to control access to the memory based on the intercepted memory access request.

5. The system of claim 4, wherein the memory access control unit comprises a register adapted to store an address representing the location of firmware code in memory, and wherein the memory access control unit is further adapted to determine if the intercepted memory access request is requesting access to the address stored in the register and to control access to the memory based on an outcome of the determination.

6. The system of claim 4, wherein the memory access control unit is further adapted to enable access to the register when access to firmware code is enabled, and to disable access to the register when access to application code is enabled.

7. The system of claim 1, wherein at least part of the memory access control unit is implemented in read-only memory.

8. The system of claim 1, wherein the system is part of a microcontroller.

9. The system of claim 1, wherein the system is part of a system-on-chip application development system.

10. A method of controlling access of a processing unit of a processing system to firmware code and application code stored by a memory of the processing system, the method comprising the steps of:
    disabling access to firmware code when access to application code is enabled; and
    disabling access to application code when the application code calls to the firmware code through a single entry point address when the single entry point address matches an address stored in a register of the memory access control unit;
    wherein disabling access to the application code is performed when the application code calls to the firmware code and disabling access to the firmware code is performed when execution of the firmware code is completed; and
    wherein the single entry point address corresponds to a dispatcher function to which the application code passes at least one parameter to define at least one function of the firmware code to be executed.

11. The method of claim 10, further comprising the step of disabling a debug interface so that debugging cannot be performed when access to firmware code is enabled.

12. The method of claim 10, further comprising the steps of:
    intercepting a memory access request from the processor; and
    controlling access to the memory based on the intercepted memory access request.

13. The method of claim 12, wherein the step of controlling access to the memory based on the intercepted memory access request comprises:
    determining if the intercepted memory access request is requesting access to a predetermined address; and
    controlling access to the memory based on an outcome of the determination.

14. A non-transitory computer-readable storage medium storing instructions that, when executed by a processing unit, control access of the processing unit to firmware code and application code by:
   disabling access to firmware code when access to application code is enabled; and
   disabling access to application code when the application code calls to the firmware code through a single entry point address when the single entry point address matches an address stored in a register of the memory access control unit;
   wherein disabling access to the application code is performed when the application code calls to the firmware code and disabling access to the firmware code is performed when execution of the firmware code is completed; and
   wherein the single entry point address corresponds to a dispatcher function to which the application code passes at least one parameter to define at least one function of the firmware code to be executed.

* * * * *